United States Patent
Amano et al.

(10) Patent No.: US 9,902,213 B2
(45) Date of Patent: Feb. 27, 2018

(54) TIRE

(75) Inventors: Masakazu Amano, Kodaira (JP); Masahiro Yabashi, Kodaira (JP)

(73) Assignee: BRIDGESTONE CORPORATION, Chuo-Ku, Tokyo (JP)

( * ) Notice: Subject to any disclaimer, the term of this patent is extended or adjusted under 35 U.S.C. 154(b) by 840 days.

(21) Appl. No.: 13/814,418

(22) PCT Filed: Aug. 5, 2011

(86) PCT No.: PCT/JP2011/067930
§ 371 (c)(1),
(2), (4) Date: Feb. 5, 2013

(87) PCT Pub. No.: WO2012/018106
PCT Pub. Date: Feb. 9, 2012

(65) Prior Publication Data
US 2013/0133806 A1    May 30, 2013

(30) Foreign Application Priority Data
Aug. 6, 2010  (JP) .................................. 2010-177781

(51) Int. Cl.
*B60C 15/00* (2006.01)
*B60C 15/06* (2006.01)

(52) U.S. Cl.
CPC .......... *B60C 15/06* (2013.01); *B60C 15/0018* (2013.01); *B60C 15/0632* (2013.01);
(Continued)

(58) Field of Classification Search
CPC ............ B60C 15/0603; B60C 15/0607; B60C 15/0628; B60C 2015/061;
(Continued)

(56) References Cited

U.S. PATENT DOCUMENTS 4,023,608 A * 5/1977 Meiss ................. B60C 15/0072
152/541
5,033,524 A * 7/1991 Ohtsuka .................. B60C 15/06
152/539

(Continued)

FOREIGN PATENT DOCUMENTS

JP    59029504 A  *  2/1984
JP    60248410 A  *  12/1985  ............. B60C 15/06
(Continued)

OTHER PUBLICATIONS

English machine translation of JP 2005-112042 A, dated Apr. 28, 2005.*

(Continued)

*Primary Examiner* — Michael H. Wilson
*Assistant Examiner* — Kendra Ly
(74) *Attorney, Agent, or Firm* — Sughrue Mion, PLLC

(57) ABSTRACT

Disclosed is a tire (1) which comprises: a bead core (10); a first bead filler (20); a first carcass (30); a second bead filler (40); and a rubber chafer (50) disposed at the outer side of the second bead filler (40) in the tread width direction. The second bead filler (40) covers a first bead filler outer end part (23) in the tread width direction, and a second bead filler inner end part (48) is disposed outside the bead core (10) in the tire radius direction. The rubber chafer (50) covers the second bead filler (40) in the tread width direction, and the loss tangent of the second bead filler (40) is smaller than the loss tangent of the rubber chafer (50).

10 Claims, 4 Drawing Sheets

(52) U.S. Cl.
CPC ...... *B60C 15/0603* (2013.01); *B60C 15/0607* (2013.01); *B60C 15/0628* (2013.01); *B60C 2015/0614* (2013.01); *B60C 2015/0621* (2013.01)

(58) Field of Classification Search
CPC .... B60C 2015/0614; B60C 2015/0617; B60C 2015/0621; B60C 2015/0625; B60C 15/0009; B60C 15/0054; B60C 2015/0639; B60C 2015/0642; B60C 2015/0646; B60C 2015/065; B60C 15/0635; B60C 15/0018; B60C 15/0027
USPC ................................................ 152/539–547
See application file for complete search history.

(56) References Cited

U.S. PATENT DOCUMENTS

| | | | |
|---|---|---|---|
| 5,253,690 | A | 10/1993 | Ueyoko et al. |
| 6,591,883 | B2 | 7/2003 | Auxerre |
| 8,146,638 | B2 | 4/2012 | Maruoka |
| 2001/0018941 | A1 | 9/2001 | Auxerre |
| 2005/0045260 | A1* | 3/2005 | Maruoka ................ B60C 15/06 152/541 |
| 2005/0211360 | A1 | 9/2005 | Ishida |
| 2007/0151649 | A1 | 7/2007 | Numata |
| 2009/0294011 | A1 | 12/2009 | Maruoka |
| 2010/0147439 | A1 | 6/2010 | Koeune et al. |

FOREIGN PATENT DOCUMENTS

| | | | | | |
|---|---|---|---|---|---|
| JP | 1254409 | A | | 10/1989 | |
| JP | 7144516 | A | | 6/1995 | |
| JP | 09188112 | A | * | 7/1997 | ......... B60C 15/0018 |
| JP | 1076822 | A | | 3/1998 | |
| JP | 11034621 | A | * | 2/1999 | |
| JP | 11-147408 | A | | 6/1999 | |
| JP | 2000-198332 | A | | 7/2000 | |
| JP | 2000309210 | A | | 11/2000 | |
| JP | 2002-178724 | A | | 6/2002 | |
| JP | 2002200904 | A | * | 7/2002 | |
| JP | 2002521253 | A | | 7/2002 | |
| JP | 2003054226 | A | * | 2/2003 | |
| JP | 2004-066980 | A | | 3/2004 | |
| JP | 2005112042 | A | * | 4/2005 | |
| JP | 2006175892 | A | | 7/2006 | |
| JP | 2007-196988 | A | | 8/2007 | |
| JP | 2007-210363 | A | | 8/2007 | |
| JP | 2009-120739 | A | | 6/2009 | |
| JP | 2009-292309 | A | | 12/2009 | |
| JP | 2009286225 | A | | 12/2009 | |
| JP | 2010-137853 | A | | 6/2010 | |
| KR | 100821550 | B1 | | 4/2008 | |

OTHER PUBLICATIONS

Machine Translation: JP 2002200904 A; Kuniyasu, Takaaki; no date.*
Machine Translation: JP 2003054226 A; Suda, Yasutaka; no date.*
Machine Translation: JP 59029504 A; Ochiai, Kiyoshi;no date.*
Machine Translation: JP 11034621 A; Kamiyoko, Kiyoshi; No date.*
Machine Translation: JP-60248410-A; Suzuki, Toshihiko; no date.*
Machine Translation: JP-09188112-A; Yamane, Kenji; no date.*
Communication dated Jan. 6, 2015 from the Japanese Patent Office in counterpart application No. 2012-527780.
Communication dated Jan. 5, 2016, issued by the Japan Patent Office in corresponding Japanese Application No. 2012-527780.
Communication dated Nov. 27, 2014, issued by the State Intellectual Property Office of the People's Republic of China in corresponding Chinese Application No. 201180046592.5.
International Search Report of PCT/JP2011/067930 dated Nov. 8, 2011.
Communication dated Mar. 3, 2017, issued from the Europe Patent Office in counterpart European Patent Application No. 11814731.3.

* cited by examiner

TIRE

CROSS REFERENCE TO RELATED APPLICATIONS

This application is a National Stage of International Application No. PCT/JP2011/067930 filed on Aug. 5, 2011, which claims priority from Japanese Patent Application No. 2010-177781 filed Aug. 6, 2010, the contents of all of which are incorporated herein by reference in their entirety.

TECHNICAL FIELD

The present invention relates to a tire provided with a reinforcing member for reinforcing a bead unit.

BACKGROUND ART

A factor for reducing the endurance of a bead unit includes delamination (separation) between a carcass and a rubber member making contact with the outer side in the tread width direction of the carcass. One factor causing the separation is stress generated by upthrust from a rim. Due to this stress, shear strain occurs and delamination occurs between the carcass and the rubber member. There has been known a tire in which a reinforcing member (for example, a rubber chafer) is arranged at the outer side in the tread width direction of the bead unit in order to suppress the stress (for example, refer to Patent Literature 1). The reinforcing member attenuates the stress generated by the upthrust from the rim, so that the separation is suppressed and the endurance of the bead unit is improved.

CITATION LIST

Patent Literature

[PTL 1] Japanese Patent Application Publication No. 2004-66980

SUMMARY OF INVENTION

In recent years, with an increased awareness for environmental concerns, the reduction of the tire weight is required. By reducing the tire weight, it is possible to reduce rolling resistance, resulting in the reduction of fuel consumption. A tire with the aforementioned structure has a problem that although the endurance of the bead unit is improved, the reinforcing member is provided, and as a result, the weight of the tire is increased.

By shortening a bead filler as compared with a conventional bead filler, the reduction of the bead unit weight is possible. In a tire with a shortened bead filler, since stress generated by curvature and deformation of a side wall portion acts toward the vicinity of a front end portion of the shortened bead filler, separation may easily occur originating from somewhere near the front end portion of the bead filler. In this regard, a reinforcing member (a second bead filler) is provided at the outer side in the tire radial direction of the bead filler.

However, according to use conditions (for example, when a high load is applied to a tire with high inner pressure), even when the second bead filler is provided, separation might occur. In addition, the stress generated by the upthrust from the rim acts toward the vicinity of the front end portion of the bead filler from the vicinity of the surface of the bead unit making contact with the rim. Therefore, the stress is concentrated on the vicinity of the front end portion of the bead filler, thereby causing a problem that separation easily occurs originating from somewhere near the front end portion of the bead filler.

As described above, in the tire provided with the reinforcing member for reinforcing the bead unit, it was difficult to achieve both the reduction of the bead unit weight and the improvement of the endurance of the bead unit.

Therefore, the present invention has been achieved in view of the above-described problems, and an object thereof is to provide a tire provided with a reinforcing member for reinforcing a bead unit, capable of achieving both the reduction of the bead unit weight and the improvement of the endurance of the bead unit.

To solve the above problem, the present invention has following features. A feature of the present invention is summarized as a tire, comprising: a pair of bead cores (bead cores 10); a pair of first bead fillers (first bead fillers 20) arranged at an outer side in a tire radial direction of the bead cores; a first carcass (first carcass 30) extending between the pair of bead cores and the pair of first bead fillers, and curved to an outer side in a tread width direction to roll up the bead cores and the first bead fillers; a second bead filler (second bead filler 40) arranged at the outer side in the tread width direction from the first carcass curved to the outer side in the tread width direction; and a rubber chafer (rubber chafer 50) arranged at the outer side in the tread width direction of the second bead filler, wherein the second bead filler covers end portions (first bead filler outer end portion 23) of the outer side in the tire radial direction of the first bead fillers in the tread width direction, an end portion (second bead filler inner end portion 48) of the inner side in the tire radial direction of the second bead filler is arranged at the outer side in the tire radial direction from the bead cores; the rubber chafer covers the second bead filler in the tread width direction, and a loss tangent of the second bead filler is smaller than a loss tangent of the rubber chafer.

According to the feature of the present invention, in the tread width direction, the second bead filler covers an outer end portion in the tire radial direction of the first bead filler, and in the tread width direction, the rubber chafer covers the second bead filler. Accordingly, both stress acting from the side wall portion to the outer end portion in the tire radial direction of the first bead filler and stress acting from the vicinity of the surface of the bead unit making contact with the rim to the outer end portion in the tire radial direction of the first bead filler are reduced by the rubber chafer and the second bead filler in a step-by-step manner, so that it is possible to prevent stress from being concentrated on the outer end portion in the tire radial direction of the first bead filler. Thus, it is possible to prevent separation originating from somewhere near the front end portion of the bead filler. Consequently, it is possible to improve the endurance of the bead unit, as compared with the conventional tire.

The inner front end in the tire radial direction of the second bead filler is positioned at the outer side in the tire radial direction from the bead core. That is, the second bead filler according to the present invention is smaller in the tire radial direction than the conventional second bead filler. As a consequence, the bead unit weight can be reduced.

When the inner temperature of the bead unit is increased by travel, the physical property of a rubber member constituting the bead unit is changed, so that adhesive property between the rubber member and another member is easily reduced. Due to the reduction of the adhesive property, separation may occur. According to characteristics of the present invention, the loss tangent of the second bead filler is smaller than that of the rubber chafer. That is, the tan δ of the second bead filler is smaller than the tan δ of the rubber chafer. Accordingly, the heat generation of the second bead filler is suppressed as compared with the heat generation of the rubber chafer. Consequently, the heat generation of the second bead filler positioned in the bead unit is suppressed, so that it is possible to reduce an increase in the inner temperature of the bead unit. In this way, it is possible to suppress a change in the physical property of the rubber member due to the increase in the temperature of the bead unit. As a consequence, it is also possible to prevent the occurrence of separation due to the reduction of adhesive property. Consequently, it is possible to further improve the endurance of the bead unit.

Another feature of the present invention is summarized as that, in a cross section along the tire radial direction and the tread width direction in a state in which the tire is mounted in a normal rim (rim 100) having a rim flange (rim flange 110), the tire has a normal inner pressure and a normal load is applied to the tire, a height (height B2h) along the tire radial direction from a bead core-innermost surface (bead core-innermost surface 15) to an outer front end (second bead filler outer front end 45) of the second bead filler in the tire radial direction is equal to or more than 1.3 times and equal to or less than 3.0 times of a height (height Rh) along the tire radial direction from the bead core-innermost surface to a rim flange-outermost surface (rim flange-outermost surface 115), the bead core-innermost surface being an innermost surface of the bead core in the tire radial direction, the rim flange-outermost surface being an outermost surface of the rim flange in the tire radial direction.

Another feature of the present invention is summarized as that, in a cross section along the tire radial direction and the tread width direction in a state in which the tire is mounted in a normal rim having a rim flange, the tire has a normal inner pressure and a normal load is applied to the tire, an end portion (rubber chafer outer end portion 55) of the rubber chafer at the outer side in the tire radial direction approaches the inner side in the tire radial direction as it goes toward the outer side in the tread width direction.

Another feature of the present invention is summarized as that the tire comprises a nylon cord layer (nylon cord layer 70) that surrounds the bead cores toward the outer side in the tire radial direction from the inner side in the tire radial direction between the bead cores and the first carcass, in a cross section along the tire radial direction and the tread width direction in a state in which the tire is mounted in a normal rim having a rim flange, the tire has a normal inner pressure and a normal load is applied to the tire, the nylon cord layer has an outer nylon cord layer (outer nylon cord layer 70b) positioned at the outer side in the tread width direction from the bead cores, and a height (height Nh) along the tire radial direction from a bead core-innermost surface to an outer front end (outer nylon cord layer outer front end 75b) of the outer nylon cord layer in the tire radial direction is equal to or more than 0.5 times and less than 1.3 times of a height along the tire radial direction from the bead core-innermost surface to a rim flange-outermost surface, the bead core-innermost surface being the innermost surface of the bead core in the tire radial direction, the rim flange-outermost surface being the outermost surface of the rim flange in the tire radial direction.

Another feature of the present invention is summarized as that, in a cross section along the tire radial direction and the tread width direction in a state in which the tire is mounted in a normal rim having a rim flange, the tire has a normal inner pressure and a normal load is applied to the tire, a height (height B1h) along the tire radial direction from a bead core-innermost surface to an outer front end (first bead filler outer front end 25) of the first bead filler in the tire radial direction is equal to or more than 1.3 times and equal to or less than 3.0 times of a height along the tire radial direction from the bead core-innermost surface to a rim flange-outermost surface, the bead core-innermost surface being the innermost surface of the bead core in the tire radial direction, the rim flange-outermost surface being the outermost surface of the rim flange in the tire radial direction.

Another feature of the present invention is summarized as that a first carcass portion curved to the outer side in the tread width direction is an outer carcass (outer carcass 30b), in a cross section along the tire radial direction and the tread width direction in a state in which the tire is mounted in a normal rim having a rim flange, the tire has a normal inner pressure and a normal load is applied to the tire, a height (height Ch) along the tire radial direction from a bead core-innermost surface to an outer front end (outer carcass outer front end 35) of the outer carcass in the tire radial direction is higher than a height along the tire radial direction from the bead core-innermost surface to an outer front end of the second bead filler in the tire radial direction, the bead core-innermost surface being the innermost surface of the bead core in the tire radial direction.

The "normal rim" indicates the standard rim in the applicable size defined in the 2008 edition of the Year Book of the JATMA (Japan Automobile Tyre Manufactures Association). Outside of Japan, the "normal rim" is the standard rim in the applicable size described in the specifications mentioned below.

The "normal inner pressure" is the air pressure defined (pages 0 to 3, term 5) in a method of measuring a tire set forth in the 2008 edition of the Year Book of the JATMA (Japan Automobile Tyre Manufactures Association). Outside of Japan, the "normal inner pressure" is the air pressure corresponding to the air pressure at the time of measuring tire dimensions described in the specifications mentioned below.

The "normal load" is the load corresponding to the maximum loading capability when a single wheel is applied, set forth in the 2008 edition of the year Book of the JATMA (Japan Automobile Tyre Manufactures Association). Outside of Japan, the "normal load" is the maximum load (the maximum loading capability) of a single wheel in the applicable size described in the specifications mentioned below.

The specification is determined on the basis of industrial standards effective in regions where the tire is manufactured or used. For example, this would be the "Year Book of The Tire and Rim Association Inc." in the United States of America, and the "Standards Manual of The European Tire and Rim Technical Organization" in Europe.

DESCRIPTION OF EMBODIMENTS

Figure 1:
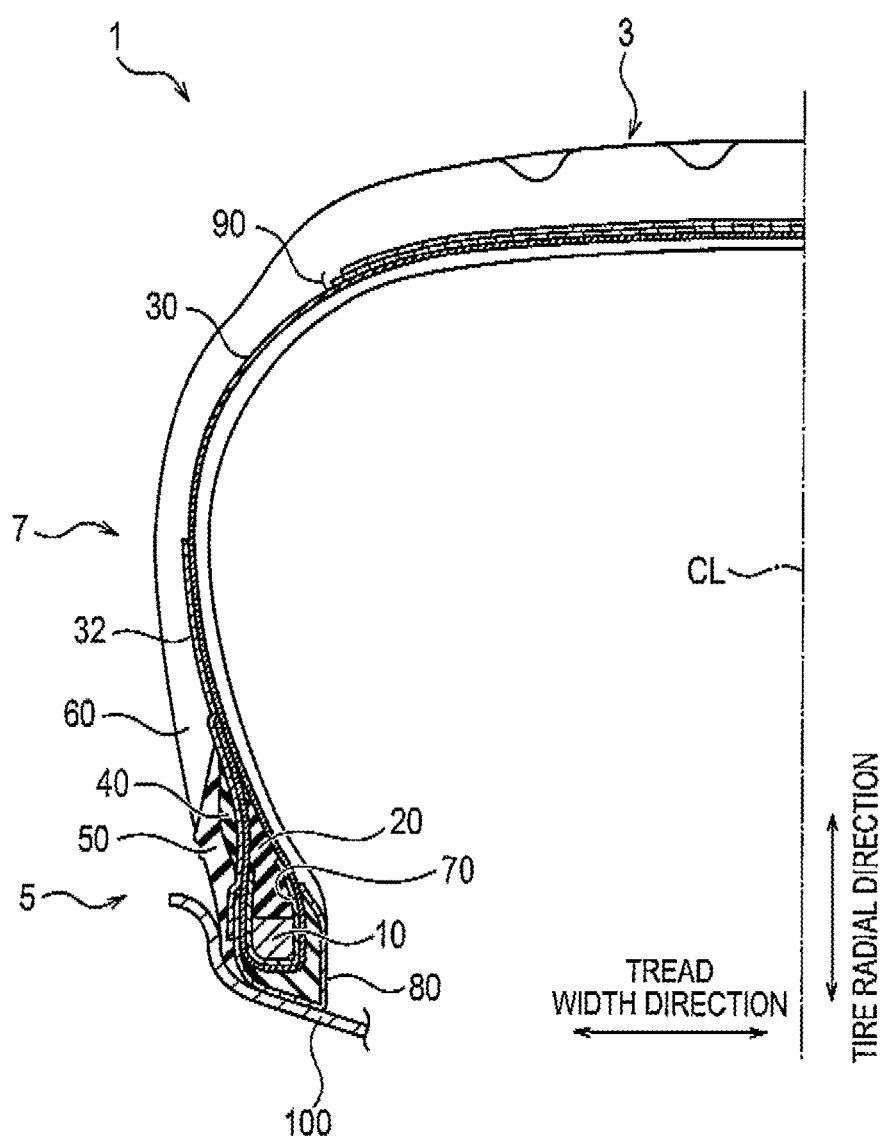
FIG. 1 is a cross sectional view along the tire radial direction and the tread width direction of a tire 1 according to the present embodiment.

An example of a tire according to the present invention will be described with reference to the drawings. Specifically, (1) Schematic configuration of tire 1, (2) Schematic configuration of bead unit 5, (3) Arrangement of members constituting bead unit 5, (4) Operation and effect, and (5) Comparative evaluations will be described.

In the following description of the drawings, the same or similar reference numerals are used to designate the same or similar parts. It will be appreciated that the drawings are schematically shown and the ratio and the like of each dimension are different from the real ones. Therefore, the specific dimensions must be determined in view of the below explanation. It is needless to say that relations and ratios among the respective dimensions may differ among the diagrams.

(1) Schematic Configuration of Tire 1

The schematic configuration of a tire 1 according to the present embodiment will be described with reference to FIG. 1. FIG. 1 is a cross sectional view along the tire radial direction and the tread width direction of the tire 1 according to the present embodiment. The tire 1 is mounted in a rim 100 which is a normal rim. The tire 1 has a normal inner pressure and is applied with a normal load.

As illustrated in FIG. 1, the tire 1 includes a tread portion 3, a bead unit 5, and a side wall portion 7. The tread portion 3 makes contact with a road surface. The bead unit 5, attached to the rim 100, makes contact with the rim 100. The side wall portion 7 links the tread portion 3 to the bead unit 5. The tire 1 includes a bead core 10, a first bead filler 20, a first carcass 30, a second carcass 32, a second bead filler 40, a robber chafer 50, a side rubber layer 60, a nylon cord layer 70, a chafer 80, and a belt layer 90.

The bead core 10 is arranged in the bead unit 5. The bead core 10 is provided in order to fix the tire 1 to the rim 100. The bead core 10 is configured by a bead wire (not illustrated).

The first bead filler 20 is arranged in the bead unit 5. Specifically, the first bead filler 20 is arranged at the outer side in the tire radial direction of the bead core 10. The first bead filler 20 has an approximate triangular shape.

The first carcass 30 is arranged over the tread portion 3, the bead unit 5, and the side wall portion 7. The first carcass 30 extend between a pair of bead cores 10 and a pair of first bead fillers 20. The first carcass 30 is curved to the outer side in the tread width direction to roll up the bead cores 10 and the first bead fillers 20.

The second carcass 32 is arranged over the bead unit 5 and the side wall portion 7. The second carcass 32 is arranged at the outer side in the tread width direction of the first carcass 30.

The second bead filler 40 is arranged in the bead unit 5. The second bead filler 40 is arranged at the outer side in the tread width direction of the first carcass 30. More specifically, the second bead filler 40 is arranged at the outer side in the tread width direction of the second carcass 32.

The robber chafer 50 is arranged in the bead unit 5. The robber chafer 50 is arranged at the outer side in the tread width direction of the bead unit 5. More specifically, the robber chafer 50 is arranged at the outer side in the tread width direction of the second carcass 32 and the second bead filler 40.

The side rubber layer 60 is arranged in the side wall portion 7. The side rubber layer 60 is arranged at the outer side in the tread width direction of the first carcass 30.

The nylon cord layer 70 is arranged in the bead unit 5. The nylon cord layer 70 surrounds the bead core 10 toward the outer side in the tire radial direction from the inner side in the tire radial direction between the bead core 10 and the first carcass 30.

The chafer 80 is arranged in the bead unit 5. The chafer 80 extends between the first carcass 30 and the second carcass 32 in the tread width direction through the surface of the inner end portion in the tire radial direction of the bead unit 5 from the inner surface in the tread width direction of the bead unit 5. The chafer 80 is provided for preventing toe chipping.

The belt layer 90 is arranged in the tread portion 3. The belt layer 90 is arranged at the outer side in the tire radial direction of the first carcass 30. The belt layer 90 is configured by two belts.

(2) Schematic Configuration of Bead Unit 5

Figure 2:
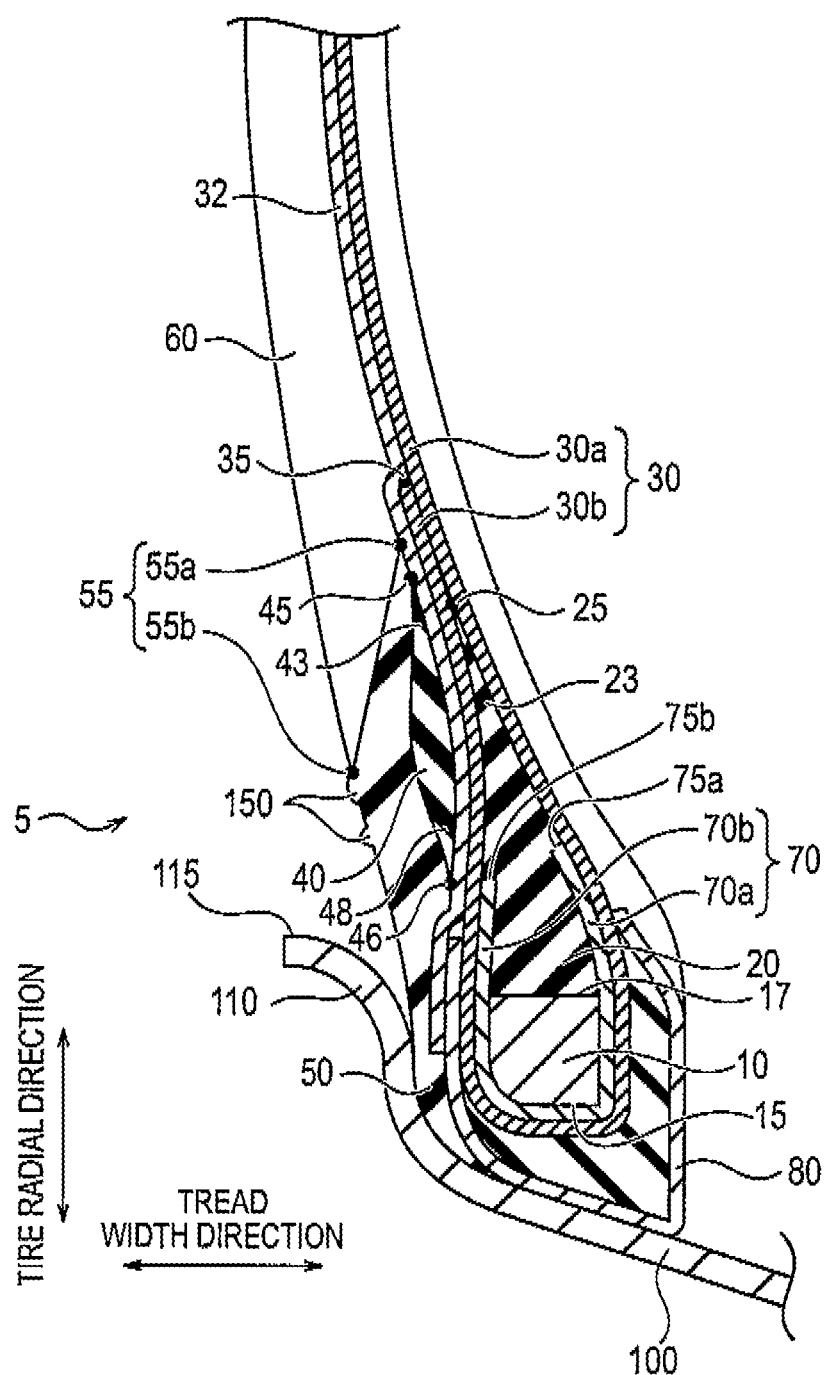
FIG. 2 is an enlarged cross sectional view of a bead unit 5 in FIG. 1.

The schematic configuration of the bead unit 5 according to the present embodiment will be described with reference to FIG. 2. FIG. 2 is an enlarged cross sectional view of the bead unit 5 in FIG. 1.

As illustrated in FIG. 2, the bead unit 5 includes the bead core 10, the first bead filler 20, the first carcass 30, the second carcass 32, the second bead filler 40, the robber chafer 50, the nylon cord layer 70, and the chafer 80.

The bead core 10 has a bead core-innermost surface 15 which is an innermost surface of the bead core 10 in the tire radial direction. Furthermore, the bead core 10 has a bead core-outermost surface 17 which is an outermost surface of the bead core 10 in the tire radial direction.

The first bead filler 20 has a first bead filler outer end portion 23 which is an outer end portion in the tire radial direction of the first bead filler 20. As illustrated in FIG. 2, the thickness of the first bead filler outer end portion 23 is reduced toward the outer side in the tire radial direction, that is, a first bead filler outer front end 25 which is an outermost end of the first bead filler in the tire radial direction. An inner end portion in the tire radial direction of the first bead filler 20 makes contact with the bead core 10.

The first carcass 30 has an inner carcass 30a positioned at the inner side in the tread width direction and an outer carcass 30b curved to the outer side in the tread width direction. The outer carcass 30b is positioned at the outer side in the tread width direction from the inner carcass 30a. An outer carcass outer front end 35, which is an outermost end in the tire radial direction of the outer carcass 30b, makes contact with the inner carcass 30a. Between the inner carcass 30a and the outer carcass 30b, the bead core 10 and the first bead filler 20 are arranged.

The second carcass 32 is arranged at the outer side in the tread width direction of the outer carcass 30b while making contact with the outer carcass 30b. An outer end portion in the tire radial direction of the second carcass 32 is positioned at the side wall portion 7.

The second bead filler 40 is positioned at the outer side in the tread width direction from the outer carcass 30b. The second bead filler 40 has a second bead filler outer end portion 43 which is an outer end portion in the tire radial direction, and a second bead filler inner end portion 48 which is an inner end portion in the tire radial direction. As illustrated in FIG. 2, the thickness of the second bead filler 40 is reduced toward the end portion of the second bead filler 40 in the tire radial direction from the center of the second bead filler 40 in the tire radial direction. That is, the thicknesses of the second bead filler outer end portion 43 and the second bead filler inner end portion 48 are thinner than that of the center of the second bead filler 40.

The second bead filler 40 covers the first bead filler outer front end 25 in the tread width direction. Accordingly, the second bead filler 40 overlaps the first bead filler outer front end 25 in the tread width direction. A second bead filler outer front end 45, which is an outermost end of the second bead filler outer end portion 43 in the tire radial direction, is positioned at the outer side in the tire radial direction from the first bead filler outer front end 25. The second bead filler inner end portion 48 is positioned at the outer side in the tire radial direction from the bead core 10. That is, a second bead filler inner front end 46, which is an inner front end of the second bead filler inner end portion 48 in the tire radial direction is positioned at the outer side in the tire radial direction from the bead core 10. Accordingly, the second bead filler inner front end 46 is positioned at the outer side in the tire radial direction from the bead core-outermost surface 17. The second bead filler 40 makes contact with the second carcass 32 at the inner side in the tread width direction. The second bead filler 40 makes contact with the rubber chafer 50 at the outer side in the tread width direction.

The rubber chafer 50 is arranged at the outer side in the tread width direction of the second bead filler 40. The rubber chafer 50 is exposed at the outer side in the tread width direction of the bead unit 5. A rim line 150 is formed at an exposed portion of the rubber chafer 50. The rubber chafer 50 has a rubber chafer outer end portion 55 which is an outer end portion in the tire radial direction. The rubber chafer outer end portion 55 has different heights in the tire radial direction at the inner side in the tread width direction and the outer side in the tread width direction. At the rubber chafer outer end portion 55, a rubber chafer width direction-inner end 55a positioned at the inner side in the tread width direction has a height in the tire radial direction, which is higher than that of a rubber chafer width direction-outer end 65b positioned at the outer side in the tread width direction. That is, the rubber chafer width direction-outer end 55b is so positioned at the inner side in the tire radial direction from the rubber chafer width direction-inner end 55a. The rubber chafer outer end portion 55 approaches the inner side in the tire radial direction as it goes toward the outer side in the tread width direction.

In the tread width direction, the rubber chafer 50 covers the second bead filler 40. Accordingly, the rubber chafer outer end portion 55 is positioned at the outer side in the tread width direction from the second bead filler outer front end 45. More specifically, the rubber chafer width direction-inner end 55a is positioned at the outer side in the tread width direction from the second bead filler outer front end 45. The inner end portion of the rubber chafer 50 in the tire radial direction makes contact with the rim 100 (a rim flange 110).

The rubber chafer 50 includes a rubber-like member. The rubber chafer 50 has a density lower than that of the second bead filler 40. Furthermore, the loss tangent of the second bead filler 40 is smaller than that of the rubber chafer 50.

The side rubber layer 60 makes contact with the second carcass 32 at the inner side in the tread width direction. The side rubber layer 60 makes contact with the rubber chafer outer end portion 55 at the inner side in the tire radial direction.

The nylon cord layer 70 includes a nylon cord. In the tread width direction, the nylon cord layer 70 has an inner nylon cord layer 70a positioned at the inner side in the tread width direction while interposing the bead core 10 therebetween, and an outer nylon cord layer 70b positioned at the outer side in the tread width direction. An outer nylon cord layer-outer front end 75b, which is an outermost end of the outer nylon cord layer 70b in the tire radial direction, makes contact with the first bead filler 20. An inner nylon cord layer-outer front end 75a, which is an outer front end of the inner nylon cord layer 70a in the tire radial direction, makes contact with the first bead filler 20.

(3) Arrangement of Members Constituting Bead Unit 5

Figure 3:
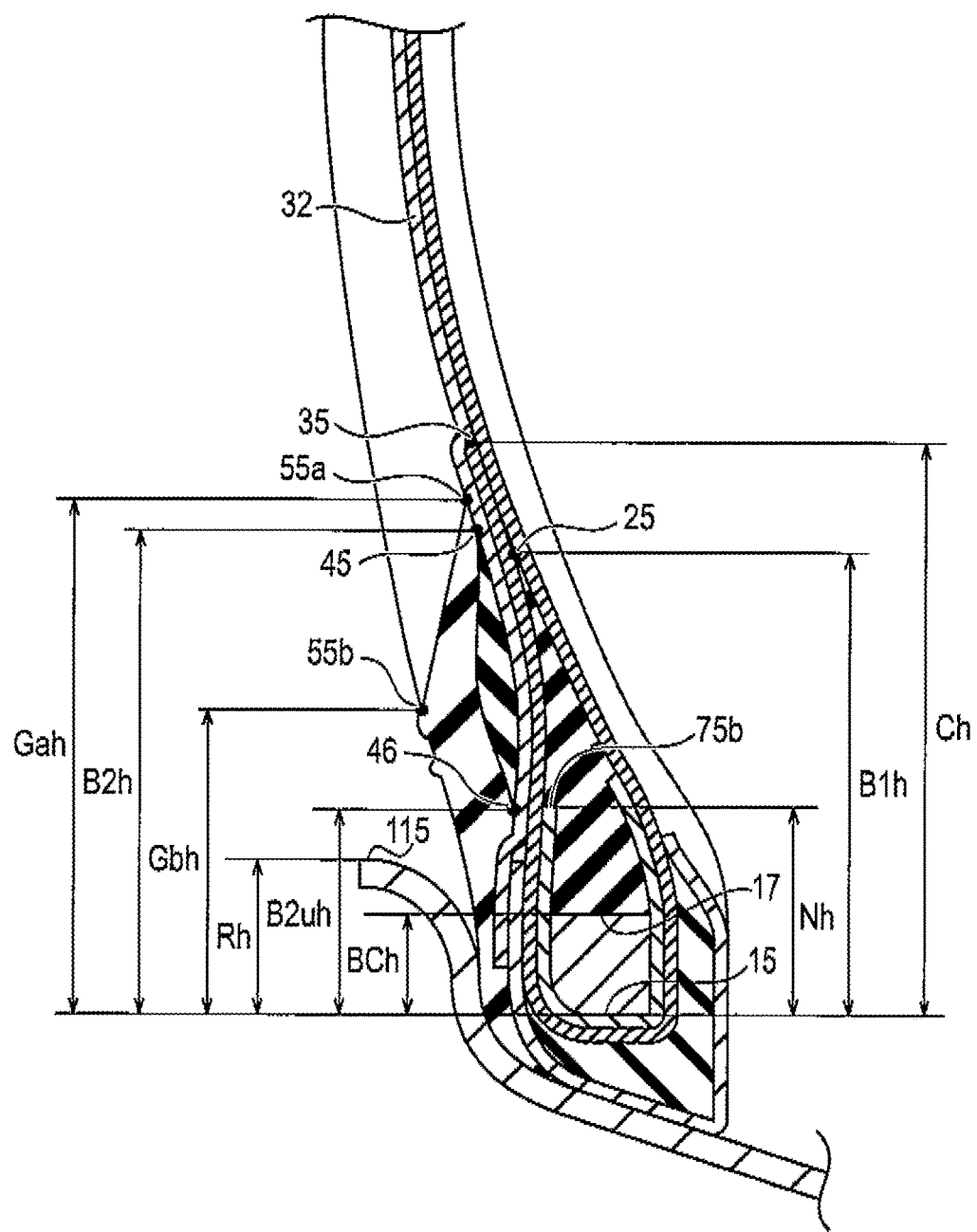
FIG. 3 is an enlarged cross sectional view of the bead unit 5 in FIG. 1.

An arrangement of members constituting the bead unit 5 according to the present embodiment will be described with reference to FIG. 3. FIG. 3 is an enlarged cross sectional view of the bead unit 5 in FIG. 1.

As illustrated in FIG. 3, the tire 1 is mounted in the rim 100. The mounted tire 1 has a normal inner pressure. Moreover, a normal load is applied to the mounted tire 1. In this state, in a cross section along the tire radial direction and the tread width direction, a height along the tire radial direction from the bead core-innermost surface 15 to the first bead filler outer front end 25 is a height B1$h$. In the cross section, a height along the tire radial direction from the bead core-innermost surface 15 to the outer carcass outer front end 35 is a height Ch. In the cross section, a height along the tire radial direction from the bead core-innermost surface 15 to the second bead filler outer front end 45 is a height B2$h$. In the cross section, a height along the tire radial direction from the bead core-innermost surface 15 to the second bead filler inner front end 46 is a height B2$uh$. In the cross section, a height along the tire radial direction from the bead core-innermost surface 15 to the bead core-outermost surface 17 is a height BCh. In the cross section, a height along the tire radial direction from the bead core-innermost surface 15 to the rubber chafer width direction-inner end 55a is a height Gah. In the cross section, a height along the tire radial direction from the bead core-innermost surface 15 to the rubber chafer width direction-outer end 55b is a height Gbh. In the cross section, a height along the tire radial direction from the bead core-innermost surface 15 to the outer nylon cord layer-outer front end 75b is a height Nh. In the cross section, a height along the tire radial direction from the bead core-innermost surface 15 to a rim flange-outermost surface 115, which is an outermost surface in the tire radial direction of the rim flange 110, is a height Rh.

In the tread width direction, since the second bead filler 40 covers the first bead filler outer front end 25, the height B2$h$ is higher than the height B1$h$. Since the second bead filler inner front end 46 is positioned at the outer side in the tire radial direction from the bead core-outermost surface 17, the height B2$uh$ is higher than the height BCh. In the tread width direction, since the rubber chafer 50 covers the second bead filler 40, the height Gah is higher than the height B2$h$.

It is preferable that the height B2$h$ is equal to or more than 1.3 times and equal to or less than 3.0 times of the height Rh. It is preferable that the height Nh is equal to or more than 0.5 times and less than 1.3 times of the height Rh. It is preferable that the height B1$h$ is equal to or more than 1.3 times and equal to or less than 3.0 times of the height Rh. It is preferable that the height Ch is higher than the height B2$h$. Furthermore, since along the tire radial direction, the height of the rubber chafer width direction-inner end 55a is higher than that of the rubber chafer width direction-outer end 55b, the height Gah is higher than the height Gbh.

In addition, it is preferable that in the cross section, a height B2$uh$ along the tire radial direction from the bead core-innermost surface 15 to the second bead filler inner front end 46 that is the tip end of the second bead filler 40 in the tire radial direction is not less than 1.0 times and not more than 2.0 times of the height Rh. The height B2$uh$ along the tire radial direction from the bead core-innermost surface 15 to the second bead filler inner front end 46 is not less than 1.0 times of the height Rh, so that the second bead filler 40 is small and thus the weight of the tire 1 is further reduced. The height B2*uh* along the tire radial direction from the bead core-innermost surface 15 to the second bead filler inner front end 16 is not more than 2.0 times of the height Rh, so that the first bead filler outer end portion 23, on which stress is concentrated, can be appropriately covered by the second bead filler 40. As a consequence, it is possible to prevent stress from being concentrated in the vicinity of the first bead filler outer end portion 23.

Furthermore, when the elastic modulus of the second bead filler 40 is smaller than that of the rubber chafer 50, the elastic modulus is reduced in a step-by-step manner from the outer side in the tread width direction to the inner side in the tread width direction. Thus, it is possible to suppress malfunction duet to a rigidity level difference. Consequently, it is possible to further improve the endurance of the bead unit 5.

(4) Operation and Effect

In accordance with the tire 1 according to the present embodiment, in the tread width direction, the second bead filler 40 covers the first bead filler outer end portion 23, and in the tread width direction, the rubber chafer 50 covers the second bead filler 40. Accordingly, stress, which acts from the side wall portion 7 to the first bead filler outer end portion 23, and stress, which acts from the vicinity of the surface of the bead unit 5 making contact with the rim 100 (the rim flange 110) to the first bead filler outer end portion 23, are reduced by the rubber chafer 50 and the second bead filler 40 in a step-by-step manner, so that it is possible to prevent stress from being concentrated on the first bead filler outer end portion 23. Thus, it is possible to prevent separation originating from somewhere near the first bead filler outer end portion 23. Consequently, it is possible to improve the endurance of the bead unit 5, as compared with the conventional tire.

Furthermore, the loss tangent of the second bead filler 40 is smaller than that of the rubber chafer 50. That is, the tan δ of the second bead filler 40 is smaller than the tan δ of the rubber chafer 50. Accordingly, the heat generation of the second bead filler 40 is suppressed as compared with the heat generation of the rubber chafer 50. Consequently, the heat generation of the second bead filler positioned in the bead unit 5 is suppressed, so that it is possible to reduce an increase in the inner temperature of the bead unit 5. In this way, it is possible to suppress a change in the physical property of the rubber member due to the increase in the temperature of the bead unit 5. As a consequence, it is also possible to prevent the occurrence of separation due to the reduction of adhesive property. Consequently, it is possible to improve the endurance of the bead unit 5, as compared with the conventional tire. In addition, in the tire 1, since the rubber chafer 50 is exposed in the bead unit 5, heat generated in the rubber chafer 50 is easily discharged. From this point, it is possible to reduce an increase in the inner temperature of the bead unit 5.

The second bead filler inner end portion 48 is positioned at the outer side in the tire radial direction from the bead core 10. That is, the second bead filler inner front end 46 is positioned at the outer side in the tire radial direction from the bead core 10. Accordingly, the second bead filler inner front end 46 is positioned at the outer side in the tire radial direction from the bead core-outermost surface 17. The second bead filler 40 according to the present invention is smaller in the tire radial direction than the conventional second bead filler 40, so that the weight of the bead unit 5 is reduced.

In accordance with the tire 1 according to the present embodiment, the height B2*h* is equal to or more than 1.3 times and equal to or less than 3.0 times of the height Rh. Furthermore, in accordance with the tire 1 according to the present embodiment, the height B1*h* is equal to or more than 1.3 times and equal to or less than 3.0 times of the height Rh. In this way, the first bead filler 20 and the second bead filler 40 can be appropriately arranged at portions on which stress, which acts from the side wall portion 7 to the vicinity of the first bead filler outer end portion 23, and stress, which acts from the vicinity of the surface of the bead unit 5 to the vicinity of the first bead filler outer end portion 28, are concentrated. When the height B1*h* and the height B2*h* exceed 3.0 times of the height Rh, since the stresses are reduced, it is preferable that the height B1*h* and the height B2*h* are equal to or less than 3.0 times of the height Rh in view of reducing weight.

In accordance with the tire 1 according to the present embodiment, the rubber chafer outer end portion 55 approaches the inner side in the tire radial direction as it goes toward the outer side in the tread width direction. When the side wall portion 7 is curved and deformed at the outer side in the tread width direction, as it approaches the maximum width in the tread width direction, strain becomes large on the surface in the tread width direction of the tire 1. That is, as it goes toward the side wall portion 7 from the bead unit 5, strain of the surface in the tread width direction becomes large. Accordingly, as the rubber chafer width direction-outer end 55*b* is positioned at the outer side in the tire radial direction, stress due to strain is concentrated on the rubber chafer width direction-outer end 55*b*. The rubber chafer width direction-outer end 55*b* is positioned at the inner side in the tire radial direction from the rubber chafer width direction-inner end 55*a*, so that stress acting on the rubber chafer width direction-outer end 55*b* is reduced and thus can be distributed to the whole of the rubber chafer outer end portion 55. As a consequence, the endurance of the rubber chafer 50 is improved, so that the endurance of the bead unit 5 is improved.

In accordance with the tire 1 according to the present embodiment, the height Nh is equal to or more than 0.5 times and less than 1.3 times of the height Rh. The height Nh is less than 1.3 times of the height Rh, so that the outer nylon cord layer-outer front end 75*b* can be positioned at the inner side in the tire radial direction from the first bead filler outer end portion 23 on which stress is concentrated. In this way, stress acting on a contact portion between the outer nylon cord layer-outer front end 75*b* and the first bead filler 20 is suppressed, so that it is possible to suppress strain occurring in the vicinity of the outer nylon cord layer-outer front end 75*b*. As a consequence, the endurance of the bead unit 5 is improved. The height Nh is equal to or more than 0.5 times of the height Rh, it is possible to expect an effect of enhancing the strength of the bead core 10 and the first bead filler 20.

In accordance with the tire 1 according to the present embodiment, the height Ch is higher than the height B2*h*. That is, the outer carcass outer front end 35 is positioned at the outer side in the tire radial direction from the second bead filler outer front end 45. In this way, the outer carcass outer front end 35 is positioned at the outer side in the tire radial direction from the first bead filler outer end portion 23 on which stress is concentrated, so that it is possible to reduce strain originating the outer carcass outer front end 35. As a consequence, the endurance of the bead unit 5 is improved.

(5) Comparative Evaluations

Figure 4:
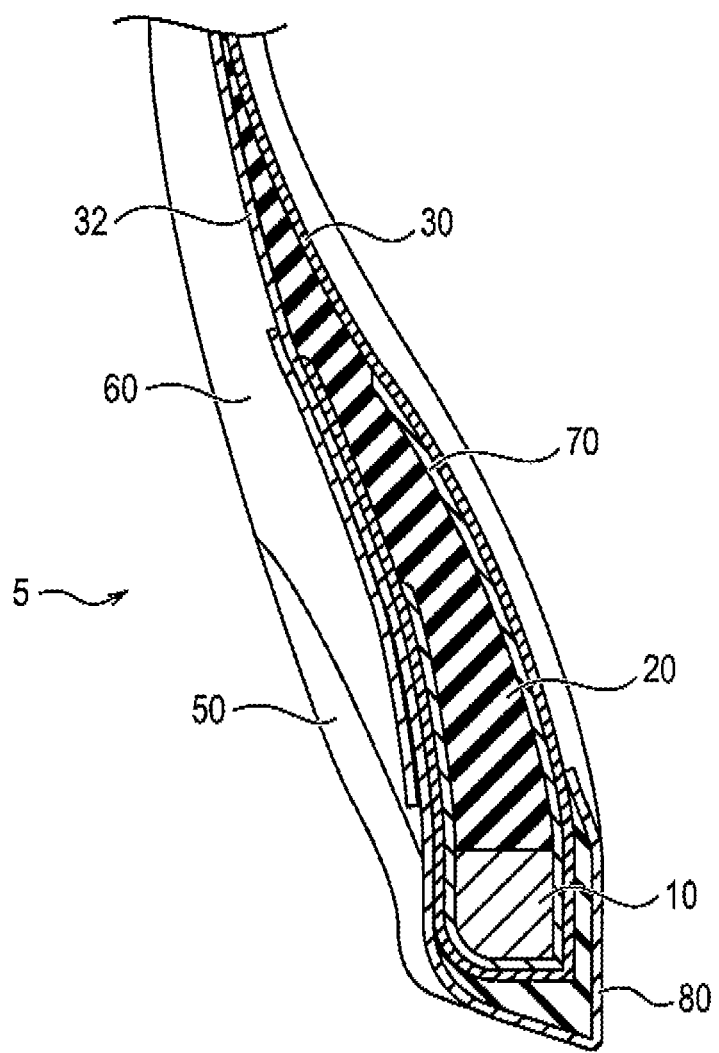
FIG. 4 is a cross sectional view of the bead unit 5 along the tire radial direction and the tread width direction of a tire according to a comparative example.

In order to clarify the effects of the tire according to the present invention, the following measurement was performed. As tires according to example 1 to example 5, a tire having the configuration of a bead unit equal to that of FIG. 2 was used. As a tire according to comparative example 1, a tire having the bead unit illustrated in FIG. 4 was used. The tire according to the comparative example 1 has a first bead filler 20 that is long in the tire radial direction, as compared with a first bead filler 20 of the example. The tire according to the comparative example 1 does not have a second bead filler, and has the rubber chafer 50 illustrated in FIG. 4. As tires according to comparative example 2 and comparative example 3, a tire having a member equal to that of the example 1 was used. However, in the tires according to the comparative example 2 and the comparative example 3, an arrangement of members constituting the bead unit is different from that in the tire according to the example.

Table 1 shows an arrangement of members constituting a bead unit of each tire. Furthermore, Table 1 shows the loss tangent (tan δ) of a second bead filler and a rubber chafer of each tire. In addition, "tan δ (B2)" of Table 1 indicates the loss tangent of the second bead filler and "tan δ (G)" of Table 1 indicates the loss tangent of the rubber chafer.

As shown in Table 1, in the example 1, the height B2h is higher than the height B1h. Accordingly, in the tread width direction, the second bead filler 40 covers the first bead filler outer front end 25. The height B2uh is higher than the height BCh. Accordingly, the second bead filler inner front end 46 is positioned at the outer side in the tire radial direction from the bead core-outermost surface 17. The height Gah is higher than the height B2h. Accordingly, in the tread width direction, the rubber chafer 50 covers the second bead filler 40. In the example 1, the loss tangent of the second bead filler is smaller than the loss tangent of the rubber chafer.

Moreover, as shown in Table 1, in the example 1, the height B2h is equal to or more than 1.3 times and equal to or less than 3.0 times of the height Rh. In the example 1, the height Nh is equal to or more than 0.5 times and less than 1.3 times of the height Rh. In the example 1, the height Bib is equal to or more than 1.3 times and equal to or less than 3.0 times of the height Rh. In the example 1, the height Ch is higher than the height B2h. Accordingly, in the example 1, the outer carcass outer front end 35 is positioned at the outer side in the tire radial direction from the second bead filler outer front end 45.

In the example 2, the height B2h is more than 3.0 times of the height Rh. Other characteristics of the example 2 are equal to those of the example 1.

In the example 3, the height Nh is less than 0.5 times of the height Rh. Other characteristics of the example 3 are equal to those of the example 1.

In the example 4, the height Nh is equal to or more than 1.3 times of the height Rh. Other characteristics of the example 4 are equal to those of the example 1.

In the example 5, the height Ch is lower than the height B2h. Accordingly, in the example 5, the outer carcass outer front end 35 is positioned at the inner side in the tire radial direction from the second bead filler outer front end 45. Other characteristics of the example 5 are equal to those of the example 1.

In the comparative example 2, the height B2h is lower than the height B1h. Accordingly, in the tread width direction, the second bead filler 40 does not cover the first bead filler outer front end 25. Other characteristics of the comparative example 2 are equal to those of the example 1.

In the comparative example 3, the loss tangent of the second bead filler is larger than the loss tangent of the rubber chafer. Other characteristics of the comparative example 3 are equal to those of the example 1.

A tire having a tire size of LT225/75R16 and a rim size of 16/6J (JATMA standard rim) was used. Except for tire weight measurement, measurement was performed by applying a load of 1875 kg (JATMA dual wheel maximum load×150%). Inner pressure of the tire was 525 kPa (JATMA dual wheel standard maximum air pressure).

In the following measurement, by using a tire numeral value of the comparative example 1 as a reference (100), the tires of the example 1 to the example 5, the comparative example 2, and the comparative example 3 were evaluated.

(5.1) Temperature Measurement

After the tires according to each example and each comparative example were mounted in an indoor drum test machine and were allowed to travel for 24 hours at a speed of 60 km/h, the temperature of a surface of a rim line position was measured. The measurement results are shown in Table 2.

(5.2) Compression Strain Measurement

After simulation models of the tires according to each example and each comparative example were created, a maximum value of compression strain along the carcass was calculated using FEM calculation under the flat pressing conditions. The measurement results are shown in Table 2.

(5.3) Travel Distance Measurement

After the tires according to each example and each comparative example were mounted in the indoor drum test machine and were allowed to travel at a speed of 60 km/h. Travel distances of the tires were measured. The measurement results are shown in Table 2.

(5.4) Tire Weight Measurement

The weight of the tires according to each example and each comparative example were measured. The measurement results are shown in Table 2.

(5.5) Result

TABLE 1

|  | second bead filler tan δ | rubber chafer tan δ | B1h (mm) | B2h (mm) | B2uh (mm) | BCh (mm) | Ch (mm) | Nh (mm) | Rh (mm) |
| --- | --- | --- | --- | --- | --- | --- | --- | --- | --- |
| Comparative Example 1 | — | 100 | 70 | — | — | 8 | 50 | 18 | 15 |
| Comparative Example 2 | 60 | 100 | 40 | 30 | 10 | 8 | 50 | 18 | 15 |
| Comparative Example 3 | 100 | 60 | 35 | 40 | 10 | 8 | 50 | 18 | 15 |
| Example 1 | 60 | 100 | 35 | 40 | 10 | 8 | 50 | 18 | 15 |
| Example 2 | 60 | 100 | 35 | 50 | 10 | 8 | 55 | 18 | 15 |

TABLE 1-continued

|  | second bead filler tan δ | rubber chafer tan δ | B1h (mm) | B2h (mm) | B2uh (mm) | BCh (mm) | Ch (mm) | Nh (mm) | Rh (mm) |
|---|---|---|---|---|---|---|---|---|---|
| Example 3 | 60 | 100 | 35 | 40 | 10 | 8 | 50 | 6 | 15 |
| Example 4 | 60 | 100 | 35 | 40 | 10 | 8 | 50 | 25 | 15 |
| Example 5 | 60 | 100 | 35 | 40 | 10 | 8 | 38 | 18 | 15 |

|  | Rim line temperature | Maximum value of compression strain | Travel distance | Weight |
|---|---|---|---|---|
| Comparative Example 1 | 100 | 100 | 100 | 100 |
| Comparative Example 2 | 85 | 80 | 95 | 95 |
| Comparative Example 3 | 110 | 100 | 60 | 95 |
| Example 1 | 75 | 64 | 125 | 95 |
| Example 2 | 80 | 70 | 110 | 98 |
| Example 3 | 76 | 66 | 110 | 95 |
| Example 4 | 77 | 85 | 105 | 96 |
| Example 5 | 90 | 90 | 105 | 94 |

As shown in Table 2, in the tires according to the example 1 to the example 5, the travel distances were improved as compared with the tires according to the comparative example 1 to the comparative example 3. In the tires according to the example 1 to the example 5, the temperature of the rim line was reduced as compared with the tire according to the comparative example 1. From this result, in the tires according to the example 1 to the example 5, since the generation of separation due to the reduction of adhesive property is suppressed, the travel distances are considered to be improved.

In the tires according to the example 1 to the example 5, the maximum value of the compression strain is reduced as compared with the tire according to the comparative example 1. Thus, it is possible to understand that concentration of stress on the vicinity of the front end portion of the first bead filler was suppressed. As a consequence, since the generation of separation originating from somewhere near the front end portion of the first bead filler is suppressed, the travel distances are considered to be improved.

In the tires according to the example 1 to the example 5, the comparative example 2, and the comparative example 3, the weight is reduced as compared with the tire according to the comparative example 1.

Accordingly, in accordance with the tires according to the present examples, it is possible to understand that the weight of the bead unit can be reduced and the endurance of the bead unit can be improved.

The present invention is disclosed through the above embodiments. However, it should not be interpreted that the statements and drawings constituting a part of the present disclosure limit the present invention. The present invention includes various embodiments not described here. Therefore, the present invention includes various embodiments not described here. Therefore, the technical range of the present invention is to be defined only by the inventive specific matter according to the adequate claims from the above description.

In addition, the entire content of Japanese Patent Application No. 2010-177781 (filed on Aug. 6, 2010) is incorporated in the present specification by reference.

INDUSTRIAL APPLICABILITY

According to the present invention, it is possible to provide a tire capable of reducing the bead unit weight while improving the endurance of the bead unit.

The invention claimed is:

1. A tire having a bead unit, comprising;
a pair of bead cores;
a pair of first bead fillers arranged at an outer side in a tire radial direction of the bead cores;
a first carcass extending between the pair of bead cores and the pair of first bead fillers, and curved to an outer side in a tread width direction to roll up the bead cores and the first bead fillers, the first carcass having, at each side in the tread width direction, an inner carcass positioned at an inner side in the tread width direction and an outer carcass curved to the outer side in the tread width direction;
a second bead filler arranged at the outer side in the tread width direction, from the outer carcass of the first carcass curved to the outer side in the tread width direction;
a rubber chafer arranged at the outer side in the tread width direction of the second bead filler;
a second carcass arranged between the first carcass and the second bead filler in the tread width direction; and
a chafer extended between the first carcass and the second carcass in the tread width direction through a surface of an inner end portion in the tire radial direction of the bead unit from an inner surface in the tread width direction of the bead unit,
wherein, at each side of the tire in the tread width direction,
the second bead filler covers an end portion of the outer side in the tire radial direction, of the first bead filler in the tread width direction,
an end portion of the inner side in the tire radial direction, of the second bead filler is arranged at the outer side in the tire radial direction from the bead core, such that the second bead filler is entirely positioned at the outer side in the tire radial direction front the bead core;
the rubber chafer contacts with the second bead filler to cover an entirety of the second bead filler in the tread width direction,
a loss tangent of the second bead filler is smaller than a loss tangent of the rubber chafer, and
an outer carcass outer front end, which is an outermost end in the tire radial direction of the outer carcass of the first carcass, makes contact with the inner carcass of the first carcass.

2. The tire according to claim 1, wherein
in a cross section along the tire radial direction and the tread width direction in a state in which the tire is mounted in a normal rim having a rim flange, the tire has a normal inner pressure and a normal load is applied to the tire,
a height along the tire radial direction from a bead core-innermost surface to an outer front end of the second bead filler, the outer front end of the second bead filler being an outermost end of the second bead filler in the tire radial direction, is equal to or more than 1.3 times and equal to or less than 3.0 times of a height along the tire radial direction from the bead core-innermost surface to a rim flange-outermost surface, the bead core-innermost surface being an innermost surface of the bead core in the tire radial direction, the rim flange-outermost surface being an outermost surface of the rim flange in the tire radial direction.

3. The tire according to claim 1, wherein
in a cross section along the tire radial direction and the tread width direction in a state in which the tire is mounted in a normal rim having a rim flange, the tire has a normal inner pressure and a normal load is applied to the tire,
an end portion of the rubber chafer at the outer side in the tire radial direction approaches the inner side in the tire radial direction as it goes toward the outer side in the tread width direction.

4. The tire according to claim 1, wherein
the tire comprises a nylon cord layer that surrounds the bead cores toward the outer side in the tire radial direction from the inner side in the tire radial direction between the bead cores and the first carcass,
in a cross section along the tire radial direction and the tread width direction in a state in which the tire is mounted in a normal rim having a rim flange, the tire has a normal inner pressure and a normal load is applied to the tire,
the nylon cord layer has an outer nylon cord layer positioned at the outer side in the tread width direction from the bead cores, and
a height along the tire radial direction from a bead core-innermost surface to an outer front end of the outer nylon cord layer, the outer frond end of the outer nylon cord layer being an outermost end of the outer nylon cord layer in the tire radial direction, is equal to or more than 0.5 times and less than 1.3 times of a height along the tire radial direction from the bead core-innermost surface to a rim flange-outermost surface, the bead core-innermost surface being the innermost surface of the bead core in the tire radial direction, the rim flange-outermost surface being the outermost surface of the rim flange in the tire radial direction.

5. The tire according to claim 1, wherein
in a cross section along the tire radial direction and the tread
width direction in a state in which the tire is mounted in a normal rim having a rim flange, the tire has a normal inner pressure and a normal load is applied to the tire,
a height along the tire radial direction from a bead core-innermost surface to an outer front end of the first bead filler, the outer front end of the first bead filler being an outermost end of the first bead filler in the tire radial direction, is equal to or more than 1.3 times and equal to or less than 3.0 times of a height along the tire radial direction from the bead core-innermost surface to a rim flange-outermost surface, the bead core-innermost surface being the innermost surface of the bead core in the tire radial direction, the rim flange-outermost surface being the outermost surface of the rim flange in the tire radial direction.

6. The tire according to claim 1, wherein
in a cross section along the tire radial direction and the tread width direction in a state in which the tire is mounted in a normal rim having a rim flange, the tire has a normal inner pressure and a normal load is applied to the tire,
a height along the tire radial direction from a bead core-innermost surface to the outer carcass outer front end of the outer carcass in the tire radial direction is higher than a height along the tire radial direction from the bead core-innermost surface to an outer front end of the second bead filler, the outer frond end of the second bead filler being an outermost end of the second bead filler in the tire radial direction, the bead core-innermost surface being the innermost surface of the bead core in the tire radial direction.

7. The tire according to claim 1, wherein the outer carcass outer front end is located on an outer side from the rubber chafer in the tire radial direction.

8. The tire according to claim 1, further comprising a sidewall portion, wherein an outer end portion in the tire radial direction of the second carcass is positioned at the side wall portion.

9. The tire according to claim 1,
wherein in a cross section along the tire radial direction and the tread width direction in a state in which the tire is mounted in a normal rim having a rim flange, the tire has a normal inner pressure and a normal load is applied to the tire, and
wherein an inner end portion in the tire radial direction of the second carcass is positioned between the rim flange and the bead core in the tire width direction.

10. The tire according to claim 1,
wherein in a cross section along the tire radial direction and the tread width direction in a state in which the tire is mounted in a normal rim having a rim flange, the tire has a normal inner pressure and a normal load is applied to the tire, and
wherein an end portion of the rubber chafer at the inner side in the tire radial direction is positioned in the surface of the inner end portion in the tire radial direction of the bead unit.

\* \* \* \* \*